Sept. 20, 1966   P. F. GIRARD   3,273,655
CENTER BODY PIVOTALLY RETRACTABLE ROTOR
Filed Aug. 2, 1965   3 Sheets-Sheet 1

INVENTOR.
PETER F. GIRARD
BY Knox & Knox

Sept. 20, 1966 P. F. GIRARD 3,273,655
CENTER BODY PIVOTALLY RETRACTABLE ROTOR

Filed Aug. 2, 1965 3 Sheets-Sheet 2

INVENTOR.
PETER F. GIRARD
BY Knox & Knox

Sept. 20, 1966  P. F. GIRARD  3,273,655
CENTER BODY PIVOTALLY RETRACTABLE ROTOR
Filed Aug. 2, 1965  3 Sheets-Sheet 3

INVENTOR.
PETER F. GIRARD
BY
Knox & Knox

United States Patent Office 3,273,655
Patented Sept. 20, 1966

3,273,655
CENTER BODY PIVOTALLY RETRACTABLE ROTOR
Peter F. Girard, La Mesa, Calif., assignor to The Ryan Aeronautical Co., San Diego, Calif.
Filed Aug. 2, 1965, Ser. No. 476,261
12 Claims. (Cl. 170—160.12)

The present invention relates to aircraft and specifically to a center body pivotally retractable rotor.

The level flight speed of a helicopter is limited by the large rotor needed to sustain the aircraft in vertical flight and provide the propulsion. Compound type helicopters have been built with fixed wings for lift in level flight, the rotor being almost or completely unloaded, but still being a drag factor. Various methods have been devised for retracting the rotor when not in use, one of these utilizing telescopic blades which extend and retract radially. The structural problems involved make this type impractical and powerful actuating means is necessary to overcome centrifugal force when retracting the blades. It has also been proposed to fold the rotor blades back to trail behind the rotor shaft, but the dynamics and vibration problems involved in stopping and folding a rotor in forward flight make this approach difficult. Another concept includes stopping a rotor in a particular position and retracting it into or enclosing it in a housing, for improved streamlining. In this instance, indexing the rotor to the stopped position is difficult and vibration is a major problem when the rotor is turning at low speed, since the rotor is stopped and started while the aircraft is moving at high forward speed and the aerodynamics of the slowly turning rotor are not compatible with the high speed longitudinal flow.

The primary object of this invention, therefore, is to provide a rotor having a streamlined center body carrying rotor blades which are synchronously extended from and retracted into the body by means of an extremely simple mechanism, which swings the blades substantially in the plane of the body, each blade being a unitary aerodynamic element with no folding or collapsible portions.

Another object of this invention is to provide a rotor in which the blades are counterbalanced about their swing axes to minimize retraction loads while the rotor is rotating.

Another object of this invention is to provide a rotor wherein the center body is of discoid configuration and does not require precise indexing for aerodynamic symmetry in the stopped position, the stopped center body contributing to the lift of the aircraft in cruising flight.

A further object of this invention is to provide a rotor which is adaptable to existing helicopter type actuating mechanisms for cyclic and collective pitch control of the blades.

Another object of this invention is to provide a retractable rotor configuration which can readily be made in many different sizes, with a wide range of disc loading characteristics, to suit particular types of aircraft.

The structure and operation of the rotor are illustrated in the drawings, in which.

Similar characters of reference indicate similar or identical elements and portions throughout the specification and throughout the views of the drawings.

*Rotor assembly*

Figure 1:
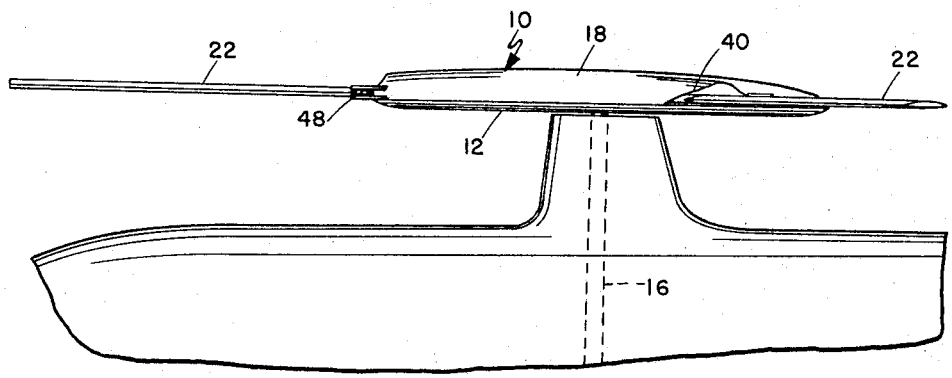
FIGURE 1 is a side elevation view of the rotor, with a portion of an aircraft indicated to show a typical mounting.

The rotor has a center body 10, preferably of discoid form for symmetry of air flow. It should be understood, however, that other shapes may be used for special purposes.

Center body 10 includes a lower shell 12 having an axial hub 14 to receive a supporting shaft 16. Mounted on top of lower shell 12 is an upper shell 18 which is rotatably on a central bearing 17 at shaft 16 and is stabilized by a peripheral bearing 19. Any suitable bearing and retaining means may be used to interconnect the two shell elements. The center body may be quite thin in proportion to its diameter to minimize drag and preferably has a somewhat lenticular airfoil form in cross section.

As illustrated the rotor has three blades units 20, but any convenient number may be used. Each blade unit 20 has a blade 22 with a shank 24 at the root end thereof containing a pitch bearing 26, which is rotatable on a pitch axis pin 28 extending from a yoke 30, said yoke being pivotally mounted on flapping hinge pins 32 in a trunnion 34. Yoke 30 swings in a generally vertical plane to accommodate the flapping and coning action of the blade. Trunnion 34 is rotatable on a lag hinge bearing 36 near the periphery of lower shell 12, said bearing being disposed substantially vertically between the lower shell and a tie plate 38 secured to the top of hub 14. The upper shell 18 has cut-outs 40 for the blades 22, the cut-outs being somewhat similar to the cross sectional shape of the blades but having clearance for coning and retraction motions of the blades. Coning motions of the blades are quite small and retracation occurs in such a manner that very little clearance is needed, so cut-outs 40 need not be unduly large.

Extending from the trunnion 34 in opposition to blade 22 is an arm 42 carrying a counterweight 44, the arm and counterweight being generally flat and closely adjacent to the lower shell 12 to prevent obstruction of the mechanism. The arm and counterweight are integral parts of the blade unit 20 and move together with the rotor blade during retraction and extension. Counterweight 44 is suitably shaped to clear the peripheral structure of lower shell 12 when the rotor blade is retracted and extended, as hereinafter described. In the blade extended position each counterweight bears against a stop 46 on the lower shell 12.

*Blade retraction mechanism*

Mounted on upper shell 18 adjacent each cut-out 40 is a retraction roller 48 freely rotatable about a vertical axis and positioned to engage the leading edge 50 of the respective rotor blade 22, when the blade is in zero pitch position. On the inside of upper shell 18 is a large ring gear 52 concentric with hub 14, and on the tie plate 38 at a suitable position is a motor 54 connected to a gear box 56 with a pinion 58 engaging said ring gear. Operation of motor 54 causes the upper shell 18 to rotate relative to lower shell 12.

Figure 2:
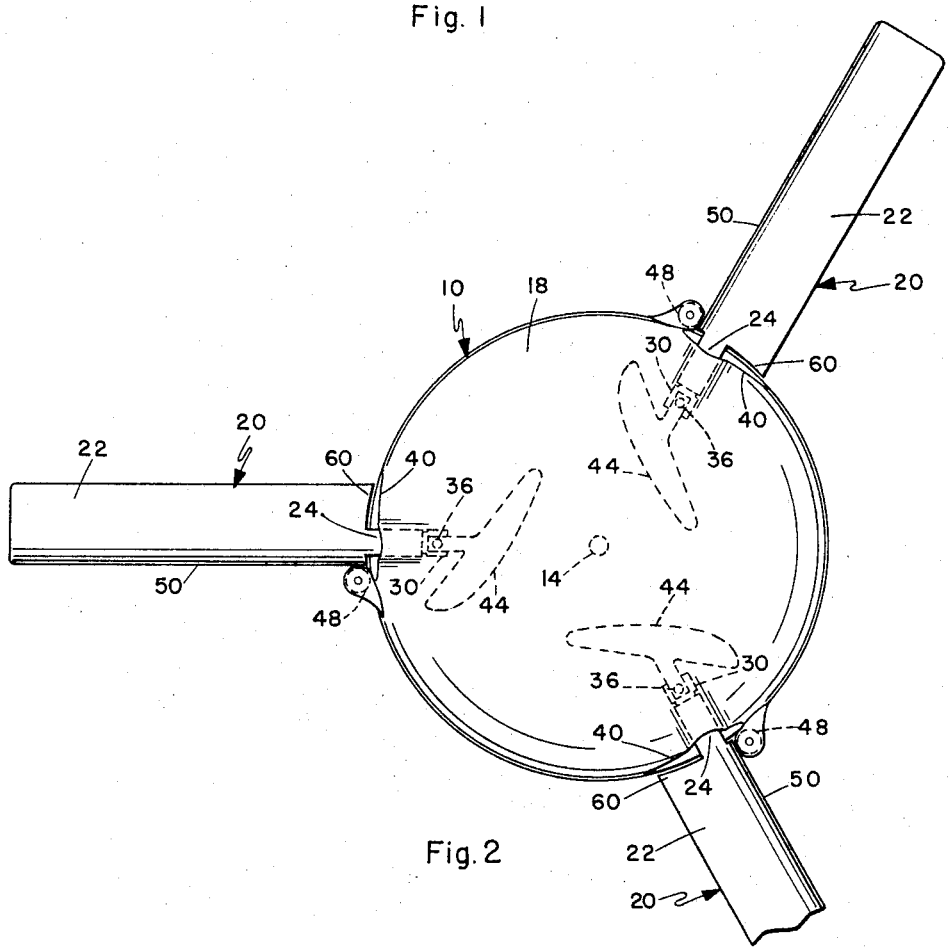
FIGURE 2 is a top plan view of the rotor with the blades fully extended.
Figure 3:
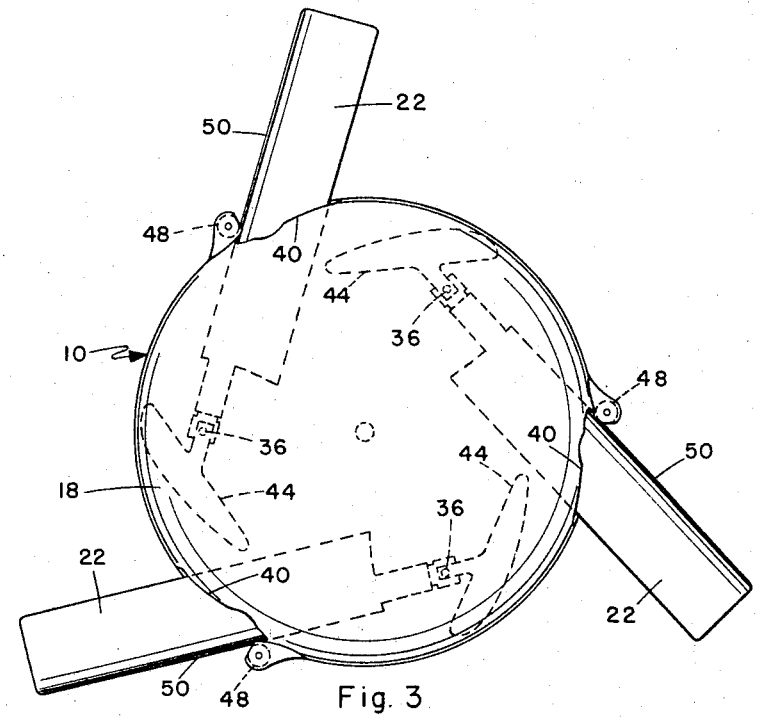
FIGURE 3 is a top plan view with the blades partially retracted.
Figure 4:
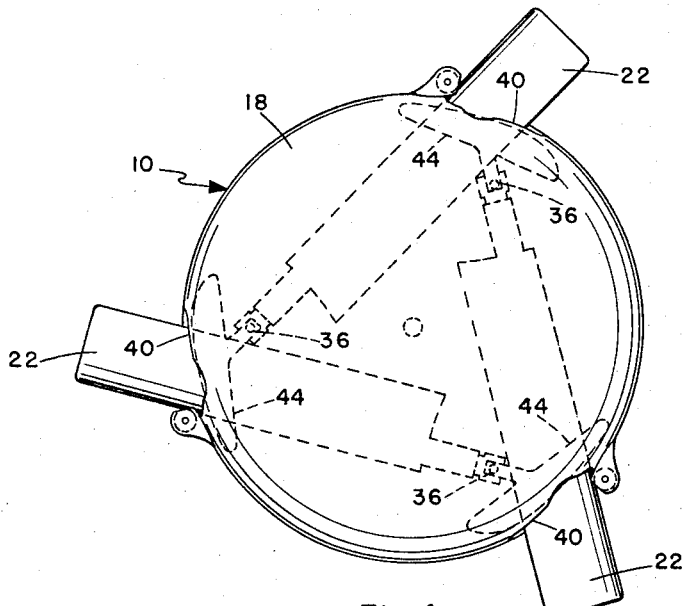
FIGURE 4 is a top plan view with the blades fully retracted.
Figures 5, 6:
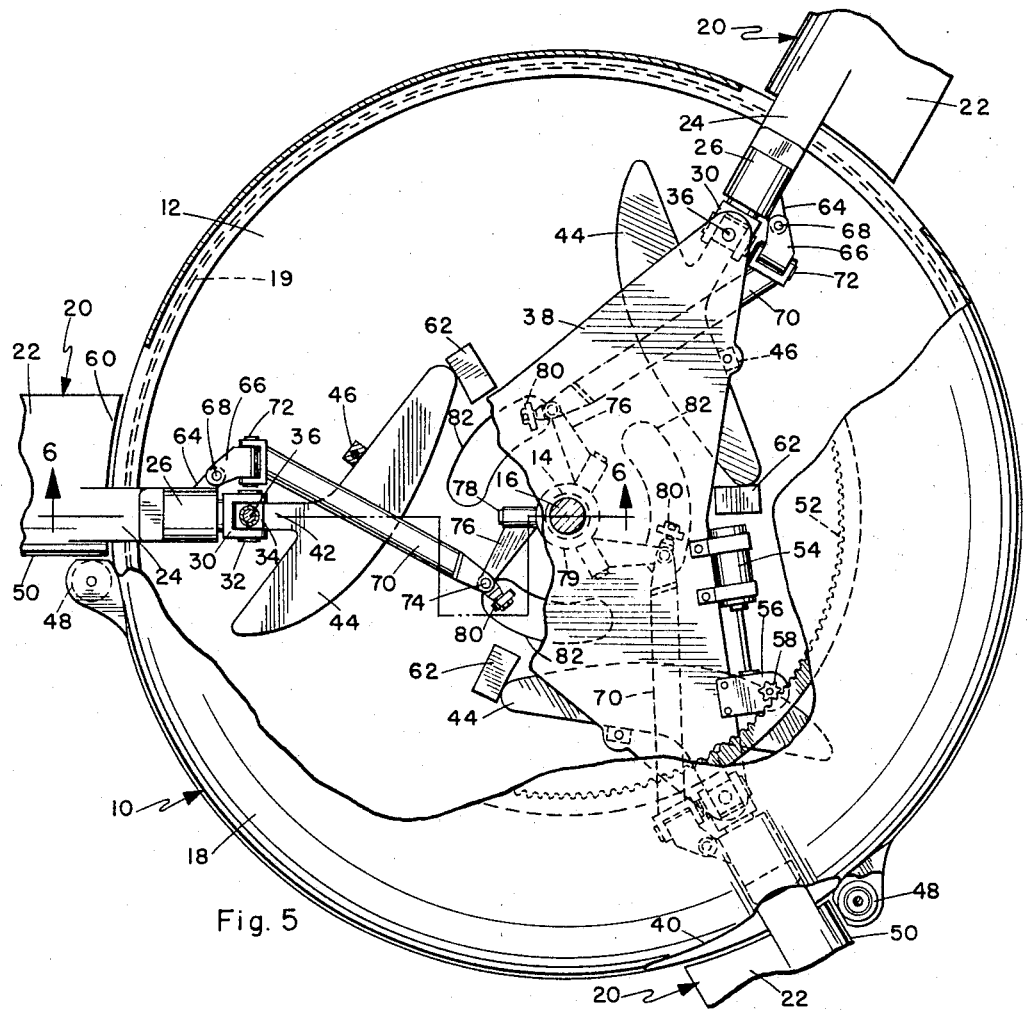
FIGURE 5 is an enlarged top plan view of the rotor center body, with portions cut away to show the actuating mechanism.
FIGURE 6 is an enlarged sectional view taken on line 6—6 of FIGURE 5.

With references to FIGURES 2–4, it will be seen that rotation of the upper shell 18 in a clockwise direction will cause retraction rollers 48 to engage blades 22 and swing the blades about their lag hinge bearings 36. The blades swing in the general plane of center body 10 and are retracted chordally across the center body, the amount of retraction being limited by the relative sizes of the center body and blades. As illustrated in FIGURE 4, the tips of the blades remain exposed in fully retracted position, but are at zero pitch and do not cause undue air flow disturbance. With suitable proportioning of the center body and blades, the blades could be drawn completely into the center body, but it is desirable to keep the center body size as small as possible. The configuration illustrated is therefore a compromise of proportions which is completely satisfactory for most applications.

In the extended position the length of the blade shank 24 is such that the full width airfoil root end portion 60 of each blade 22 is outwardly clear of the center body rim, in order to provide clearance for pitch changes. However, when the blades are being retracted or extended they are automatically held at zero pitch within the cut-outs 40.

Counterweights 44 need not completely balance the weight of blades 22, but are merely of sufficient mass to reduce the centrifugal loads to a resonable amount, so that the retraction mechanism need not be excessively powerful. Since the blades are normally extended while the rotor is turning, by the simple action of rotating upper shell 18 in the opposite direction to that required for retraction, the centrifugal force on the blades will assist extension. Except in special instances it would not be necessary to use rollers, comparable to rollers 48, against the blade trailing edges to aid extension of the blades.

To prevent free lagging motion of the blade units 20 about bearings 36 while the rotor is rotating, friction pads 62 are mounted on the lower shell 12 to engage the inboard edge of each counterweight 44 when the blades are extended. The exact position of the friction pad will depend on the particular shape of the counterweight, which is not limited to that illustrated, the pad engaging the counterweight only at he blade extended position and being positioned to allow the counterweight to swing during retraction and extension.

Pitch control mechanism

Various means may be used to control pitch of the rotor blades, as in conventional helicopters, the arrangement shown being one system adapted to the confined interior of center body 10.

Each blade shank 24 has a hinge lug 64 extending substantially radially from the housing of pitch bearing 26, with a yoke 66 pivotally mounted on said lug to pivot about a pin 68 perpendicular to but laterally offset from the pitch bearing axis. Connected to yoke 66 is one end of a torque tube 70, pivotal about a pin 72 substantially radial to the pitch bearing axis, providing a universal coupling of the torque tube to the blade shank. The other end of torque tube 70 is pivotally connected by a pin 74 to a pitch control arm 76, which swings in a generally vertical plane on a stud 78 extending radially from a sleeve 79 axially rotatable on hub 14. The axis of pin 74 is perpendicular to the axis of stud 78. Coupled to each pitch control arm 76 is a pitch control rod 80, which passes downwardly through an opening 82 in lower shell 12, the opening being circumferentially elongated to accommodate retraction motion. Pitch control rods 80 are connected to a swash plate, not shown, or other suitable helicopter type pitch actuating mechanism. Vertical motion of each pitch control rod 80 will, through torque tube 70, rotate the associated rotor blade about its pitch bearing 26.

In the zero pitch position the axes of pins 68 and 74, lag hinge bearing 36 and sleeve 79 are all parallel so that, as the blade unit swings about the lag hinge bearing, the pitch control mechanism can follow the motion without binding.

The rotor can be mounted in various positions on different types of aircraft, the arrangement shown in FIGURE 1 having a pylon 84 supporting the rotor above a fuselage 86. Shaft 16 can be driven for operation as a helicopter, or may merely be a support for a free rotating rotor for use as an autogyro type aircraft. Fixed wings or other lifting surfaces, not shown, are used in high speed flight for primary support.

Operation

Starting from a static condition on the ground, the rotor blades are extended and the rotor is rotated to a suitable speed for take-off either vertically or with a short forward run. Cyclic and collective pitch control are used in the well known manner for control, until sufficient forward speed is attained for the aircraft to be self-sustaining by its fixed lifting surfaces, as described above. The rotor is then decelerated by any suitable means, or by merely shutting off the drive means, to a rotational speed at which any vibration will be acceptable, with the rotor blades at zero pitch and the rotor substantially unloaded. Upper shell 18 is then rotated to retract the blade units 20, the counterbalancing and retraction of the blades in the plane of rotation, while being held at zero pitch, causing a minimum of vibration. The retracted rotor is then stopped and becomes a fixed body which contributes to the total lift of the aircraft.

To return to vertical flight condition the retracted rotor is rotated to a predetermined low speed, again consistent with acceptable vibration levels, and upper shell 18 is actuated to extend the blades. The rotor is then once more operational under full control.

It will be evident that the rotor structure and actuating mechanism are very simple and adaptable to a wide range of sizes and operating characteristics. The construction of the center body can be very light, since the loads of the blade units are carried primarily by the inner portiton of lower shell 12 and the tie plate 38.

It is understood that minor variation from the form of the invention disclosed herein may be made without departure from the spirit and scope of the invention, and that the specification and drawings are to be considered as merely illustrative rather than limiting.

I claim:

1. In an aircraft, a lifting rotor having means for rotatable mounting on the aircraft and being retractable and extensible in flight, the rotor comprising:
   a hollow center body;
   a plurality of rotor blades mounted to rotate with said center body and being pivotal to swing in a plane substantially perpendicular to the axis of rotation of the center body; and
   means operatively connected to said blades to swing the blades simultaneously and synchronously in a common direction between extended positions substantially radial to said center body and retracted positions disposed substantially chordally of the center body, independent of rotational speed of the rotor.

2. A rotor according to claim 1, wherein said blades are pivotally mounted within said center body to retract into and be substantially enclosed within the center body.

3. A rotor according to claim 1, wherein said rotor blades are substantially balanced about their pivotal axes.

4. A rotor according to claim 1, wherein said center body is discoid in plan form.

5. A rotor according to claim 4, wherein said center body is substantially a lenticular airfoil in cross section.

6. In an aircraft, a lifting rotor having means for rotatable mounting on the aircraft and being retractable and extensible in flight, the rotor comprising:
   a hollow, generally discoid center body;
   a plurality of rotor blades pivotally mounted within said center body to swing substantially in the plane of the center body;
   actuating means operatively connected to said blades to swing the blades simultaneously and synchronously in a common direction between extended positions substantially radial to said center body and retracted positions disposed chordally within the center body, independent of the rotational speed of the rotor; and pitch control means coupled to said blades for operation when the blades are in extended position.

7. A rotor according to claim 6, wherein said actuating means includes a peripheral portion of said center body engaging said blades and being rotatable relative to the remainder of the center body.

8. In an aircraft, a lifting rotor having means for rotatable mounting on the aircraft, the rotor comprising:
  a hollow, generally discoid center body having a lower shell and an upper shell;
  a plurality of rotor blades mounted in said center body, each of said blades having a trunnion portion pivotal on said lower shell about an axis parallel to the rotor axis;
  said upper shell being rotatable relative to said lower shell and having portions engaging said blades to swing the blades between extended positions substantially radial to said center body and retracted positions disposed chordally across the interior of the center body; and
  each of said blades being pivotal on its respective trunnion portion for pitch variation on an axis substantially perpendicular to the trunnion axis.

9. A rotor according to claim 8, wherein said upper shell has slots through which said blades extend, said slots having guide means engaging edge portions of said blades when said upper shell is rotated.

10. A rotor according to claim 9, wherein said slots conform to the cross sectional shape of said blades to hold the blades at zero pitch during retraction and extension.

11. A rotor according to claim 8 and including a counterweight on each said trunnion portion opposed to and substantially balancing the respective blade.

12. A rotor according to claim 11 and including friction means engageable with said counterweights when said blades are extended, to retard motion about the trunnion axes.

References Cited by the Examiner
UNITED STATES PATENTS

| | | | |
|---|---|---|---|
| 1,445,402 | 2/1923 | Le Velle | 170—160.12 X |
| 2,684,212 | 7/1954 | Vanderlip | 170—160.11 X |
| 2,749,994 | 6/1956 | Apostolescu | 170—160.12 X |
| 3,056,456 | 10/1962 | Michel et al. | 170—160.12 X |

MARTIN P. SCHWADRON, *Primary Examiner.*

SAMUEL LEVINE, *Examiner.*

E. A. POWELL, JR., *Assistant Examiner.*